United States Patent
McCaffrey (10) Patent No.: US 11,441,430 B2
(45) Date of Patent: Sep. 13, 2022

(54) AIRFOIL WITH BUFFER LAYER TO ABSORB THERMAL MISMATCH

(71) Applicant: United Technologies Corporation, Farmington, CT (US)

(72) Inventor: Michael G. McCaffrey, Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/784,617

(22) Filed: Feb. 7, 2020

(65) Prior Publication Data

US 2021/0246800 A1 Aug. 12, 2021

(51) Int. Cl.
*F01D 5/28* (2006.01)

(52) U.S. Cl.
CPC .......... *F01D 5/282* (2013.01); *F05D 2240/30* (2013.01)

(58) Field of Classification Search
CPC ......... F01D 5/282; F01D 5/284; F01D 5/3084
See application file for complete search history.

(56) References Cited

U.S. PATENT DOCUMENTS

| 4,323,394 | A  | 4/1982 | Hoffmueller et al. |
| 8,714,932 | B2 | 5/2014 | Noe et al. |
| 10,458,653 | B2 | 10/2019 | Freeman et al. |
| 2016/0040539 | A1* | 2/2016 | McCaffrey ............ F01D 5/3084 60/805 |
| 2017/0067345 | A1* | 3/2017 | Jadidian .................. F01D 5/147 |
| 2019/0338658 | A1 | 11/2019 | Weaver |

FOREIGN PATENT DOCUMENTS

| EP | 2612997 | 7/2013 |
| WO | 2014081496 | 5/2014 |

OTHER PUBLICATIONS

European Search Report for European Patent Application No. 21155047.0 completed Jul. 29, 2021.
European Search Report for European Patent Application No. 21155047.0 dated Nov. 15, 2021.
Partial European Search Report for European Patent Application No. 21155047.0.

* cited by examiner

*Primary Examiner* — Woody A Lee, Jr.
*Assistant Examiner* — Cameron A Corday
(74) *Attorney, Agent, or Firm* — Carlson, Gaskey & Olds, P.C.

(57) ABSTRACT

An airfoil includes a ceramic matrix composite airfoil core that defines an airfoil portion and a root portion. The ceramic matrix composite airfoil core is subject to core thermal growth. A platform includes a ceramic matrix composite that wraps around the root portion. The platform is subject to platform thermal growth. A buffer layer is located between the root portion and the platform. The buffer layer absorbs a mismatch between the core thermal growth and the platform thermal growth.

22 Claims, 6 Drawing Sheets

AIRFOIL WITH BUFFER LAYER TO ABSORB THERMAL MISMATCH

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Airfoils in the turbine section are typically formed of a superalloy and may include thermal barrier coatings to extend temperature resistance. Ceramics, such as ceramic matrix composite ("CMC") materials, are also being considered for airfoils. CMCs have high temperature resistance. Despite this attribute, there are unique challenges to implementing CMCs in airfoils.

SUMMARY

An airfoil according to an example of the present disclosure includes a ceramic matrix composite airfoil core that defines an airfoil portion and a root portion. A ceramic matrix composite wrapping wraps around the root portion, and there is a frangible layer between the root portion and the platform.

In a further embodiment of any of the foregoing embodiments, the root portion has an axial face, and the frangible layer is on the axial face.

In a further embodiment of any of the foregoing embodiments, the root portion includes circumferential faces that substantially exclude the frangible layer.

In a further embodiment of any of the foregoing embodiments, the frangible layer wraps around edges of the axial face.

In a further embodiment of any of the foregoing embodiments, the frangible layer has a thickness of 0.02 millimeters to 0.4 millimeters.

In a further embodiment of any of the foregoing embodiments, the frangible layer is a ceramic coating.

In a further embodiment of any of the foregoing embodiments, the ceramic coating is selected from the group consisting of alumina, silicon carbide, and combinations thereof.

In a further embodiment of any of the foregoing embodiments, the frangible layer includes hollow spheres disposed in a matrix.

In a further embodiment of any of the foregoing embodiments, the matrix is selected from the group consisting of alumina, silicon carbide, and combinations thereof.

In a further embodiment of any of the foregoing embodiments, the ceramic matrix composite wrapping defines a platform.

An airfoil according to an example of the present disclosure includes a fiber-reinforced composite airfoil core that defines an airfoil portion and a root portion. The fiber-reinforced composite airfoil core is subject to core thermal growth. There is fiber-reinforced composite wrapping that wraps around the root portion. The fiber-reinforced composite wrapping is subject to wrapping thermal growth. There is a buffer layer between the root portion and the platform. The buffer layer absorbs a mismatch between the core thermal growth and the platform thermal growth.

In a further embodiment of any of the foregoing embodiments, the root portion has an axial face, and the buffer layer is on the axial face.

In a further embodiment of any of the foregoing embodiments, the root portion includes circumferential faces that substantially exclude the buffer layer.

In a further embodiment of any of the foregoing embodiments, the buffer layer wraps around edges of the axial face.

In a further embodiment of any of the foregoing embodiments, the buffer layer is a coating.

In a further embodiment of any of the foregoing embodiments, the coating is selected from the group consisting of alumina, silicon carbide, and combinations thereof.

In a further embodiment of any of the foregoing embodiments, the buffer layer includes hollow spheres disposed in a matrix.

In a further embodiment of any of the foregoing embodiments, the matrix is selected from the group consisting of alumina, silicon carbide, and combinations thereof.

A gas turbine engine according to an example of the present disclosure includes a compressor section, a combustor in fluid communication with the compressor section, and a turbine section in fluid communication with the combustor. The turbine section has an airfoil that includes a ceramic matrix composite airfoil core that defines an airfoil portion and a root portion. A ceramic matrix composite wrapping wraps around the root portion, and there is a buffer layer between the root portion and the platform.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
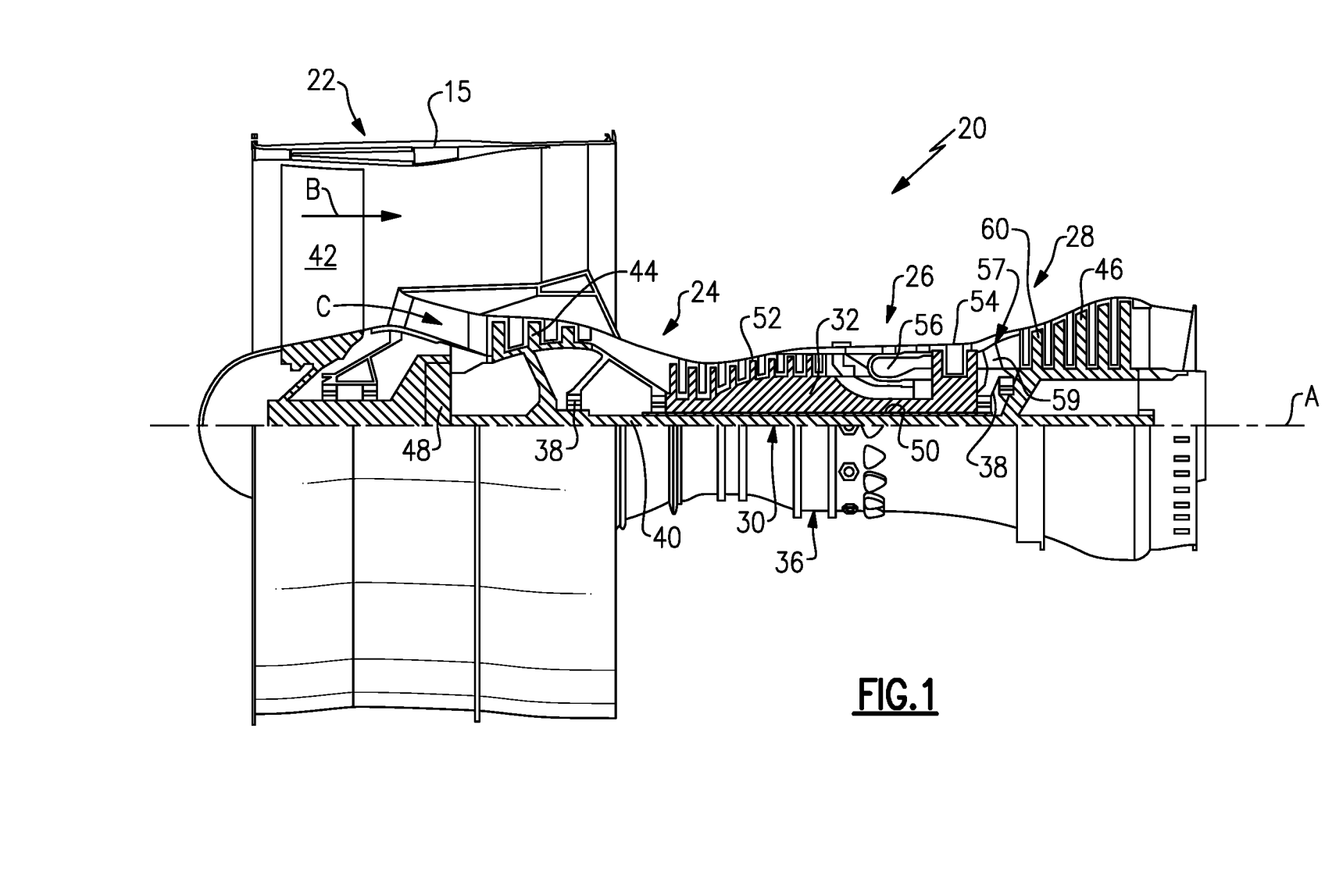
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^\circ R)/(518.7^\circ R)]^{0.5}$. The "Low corrected fan tip speed" as disclosed herein according to one non-limiting embodiment is less than about 1150 ft/second (350.5 meters/second).

Figure 2A:
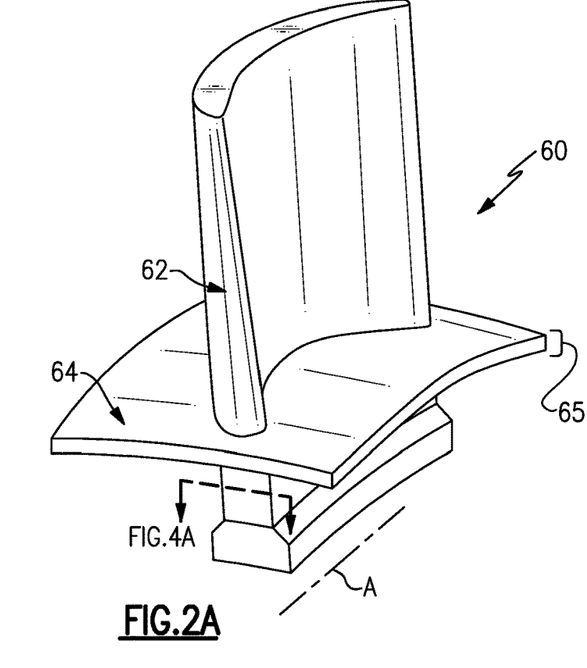
FIG. 2A illustrates an example airfoil of the gas turbine engine.

FIG. 2A illustrates a representative airfoil 60. In this example, the airfoil is from the turbine section of the engine 20 and is a rotatable blade that includes an airfoil core 62 and a ceramic matrix composite wrapping 64. Although the examples below may be presented with respect to ceramic matrix composites, this disclosure can also be applied to other fiber-reinforced composite airfoils in other locations in the engine 20 which would benefit here from. For instance, the examples of this disclosure may be applied to airfoils in the compressor section 24 that utilize high-temperature polymers, such as fiber-reinforced composites having bismaleimide matrices.

Figure 2B:
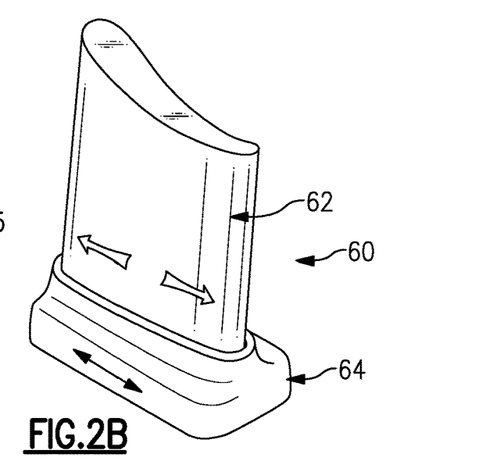
FIG. 2B illustrates an example airfoil without a platform.
Figure 2C:
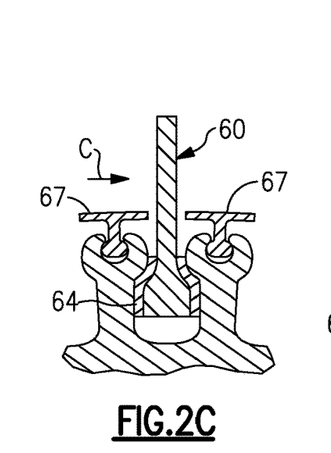
FIG. 2C illustrates the airfoil of FIG. 2B with separate platforms.

In the illustrated example, the ceramic matrix composite wrapping 64 defines a platform 65 (integrated). Although the airfoil core 62 and the ceramic matrix composite wrapping 64 are integrated into a single component, the airfoil 60, the airfoil core 62 and the ceramic matrix composite wrapping 64 are formed of distinct bodies. Alternatively, as shown in FIG. 2B, the ceramic matrix composite wrapping 64 excludes a platform and platforms 67 are provided as separate pieces. The examples herein are understood to refer to ceramic matrix composite wrapping 64 both with and without integrated platforms.

Figure 3:
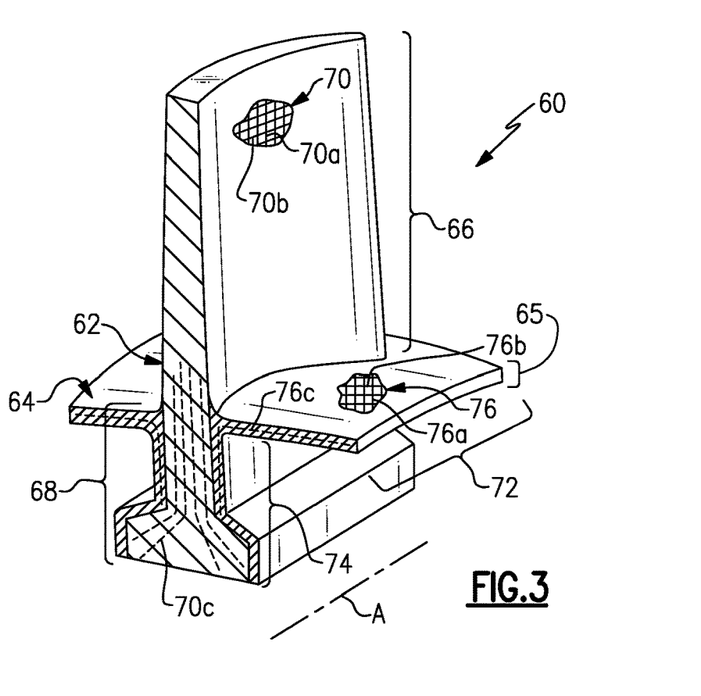
FIG. 3 illustrates a sectioned view of the airfoil of FIG. 2A.

Referring to FIG. 3, the airfoil core 62 defines several portions, including an airfoil portion 66 and a root portion 68. The airfoil portion 66 has an aerodynamic profile, while the root portion 68 has a dovetail profile. The airfoil core 62 is formed of a ceramic matrix composite ("CMC") 70 (or bismaleimide fiber-reinforced composite as indicated above), which is shown in a cutaway portion in FIG. 3 and includes fibers 70a disposed in a ceramic matrix 70b (or bismaleimide). The fibers 70a may be provided in a fiber structure, represented at 70c, such as but not limited to unidirectional, woven, or braided structures. Example fibers 70a are silicon-containing ceramic fibers, such as silicon carbide (SiC) fibers or silicon nitride ($Si_3N_4$) fibers. Other types of ceramic fibers or carbon fibers may alternatively be used. Example ceramic matrices 70b are silicon-containing ceramics, such as silicon carbide (SiC) or silicon nitride ($Si_3N_4$). Other ceramics may alternatively be used.

In the illustrated example, the ceramic matrix composite wrapping 64 includes an endwall portion 72 and a root portion 74. If there is no integrated platform 65, the endwall portion 72 is excluded such that the ceramic matrix composite wrapping 64 includes only the root portion 74. The root portion 74 surrounds the root portion 68 of the airfoil core 62 and also has a dovetail profile. The ceramic matrix composite wrapping 64 is also formed of a CMC 76 (or bismaleimide fiber-reinforced composite as indicated above), which is shown in a cutaway portion in FIG. 3 and includes fibers 76a disposed in a ceramic matrix 76b (or bismaleimide). The fibers 76a and the ceramic matrix 76b may be any of the materials described above for the CMC 70. The fibers 76a may be provided in a fiber structure, represented at 76c, such as but not limited to unidirectional, woven, or braided structures. The fiber structure 76c of the ceramic matrix composite wrapping 64 wraps around the root portion 68 of the airfoil core 62, substantially covering the axial and circumferential faces of the root portion 68 of the airfoil core 62. Most typically, the CMC 76 of the ceramic matrix composite wrapping 64 and the CMC 70 of the airfoil core 62 will be of the same composition with regard to the chemistry and amounts of the fibers 70a/76a and the matrices 70b/76b. The CMCs 70/76 may or may not have the same fiber structure.

In wrapped configurations such as in the airfoil 60, even relatively small thermal growth in a root portion of an airfoil core can cause relatively high stress in a wrapping, particularly at the axial ends due to axial growth. In this regard, as shown in the sectioned view of the airfoil 60 in FIG. 4A (see also sectioning line in FIG. 3), the airfoil 60 includes a buffer layer 78 located between the root portion 68 of the airfoil core 62 and the root portion 74 of the ceramic matrix composite wrapping 64. The buffer layer 78 absorbs relative thermal growth displacements between the root portions 68/74, to facilitate mitigation of stress on the ceramic matrix composite wrapping 64 from differences in thermal growth between the root portions 68/74. For example, the buffer layer 78 is compressible under the stress such that it becomes reduced in volume.

Figure 4A:
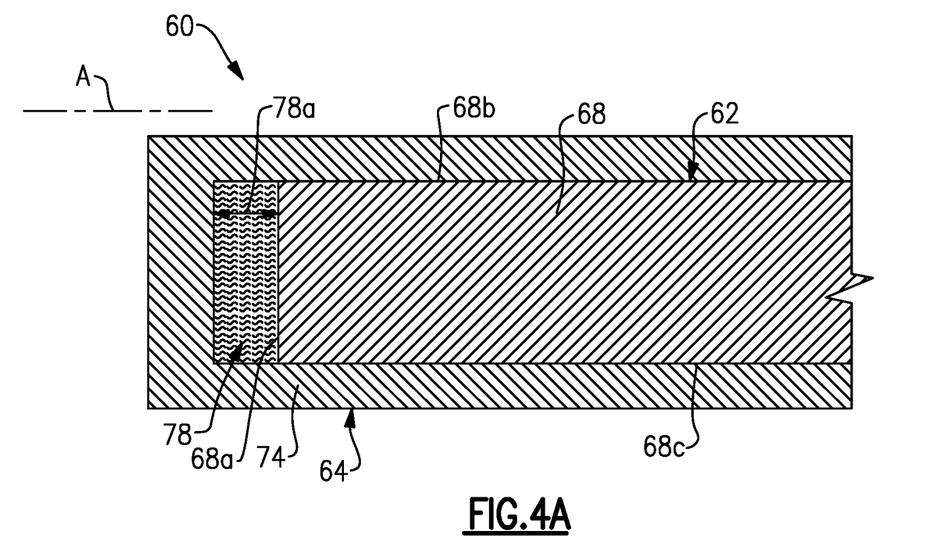
FIG. 4A illustrates a sectioned view through the root portions of the airfoil core and platform of the airfoil.

In general, the buffer layer 78 will be formed of ceramic material in order to avoid substantial damage during thermal processing of the CMCs or other fiber-reinforced composite. For instance, in the illustrated example, the buffer layer 78 is a coating. In examples, the coating is a ceramic coating such as alumina, silicon carbide, silicon nitride, silicate, oxide, boron carbide, or combinations thereof, or a metallic coating, such as elemental silicon. Other types of ceramic can additionally or alternatively be used, as long the buffer layer 78 is compressible relative to the thermal growth and stresses of the root portions 68/74. As will be appreciated, the thermal growth and stresses will vary somewhat in accordance with the composition of the CMCs and their fiber structures, as well as the size and geometry of the airfoil 60. In general, however, the root portions 68/74 will have a conforming dovetail shape and will be at least about 20 mm (millimeters) in axial length. The root portions 68/74 will typically not be more than about 70 mm in axial length. Thermal growth and stresses can be measured or estimated experimentally or by computer simulation for given materials and designs, and given this disclosure those skilled in the art will thus be readily able to identify useful buffer layers 78.

Figure 4B:
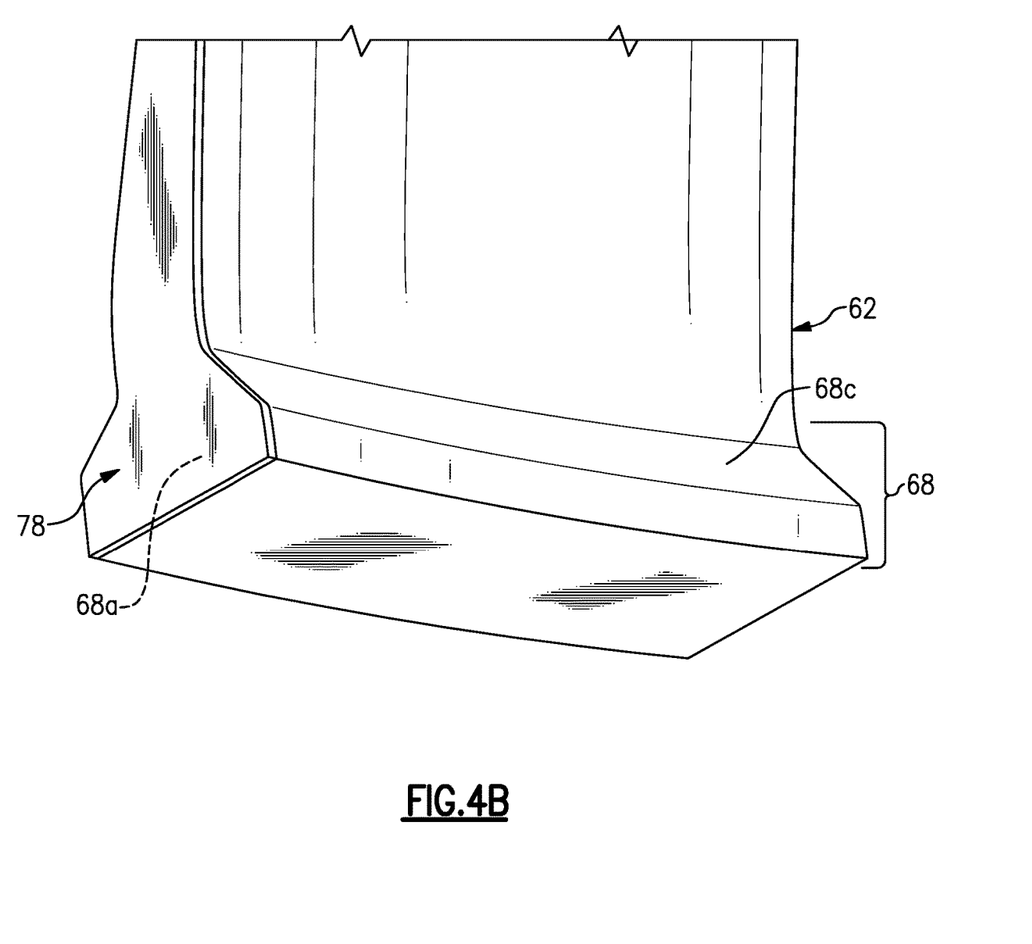
FIG. 4B illustrates an isolated view of the airfoil core and buffer layer.
Figure 5:
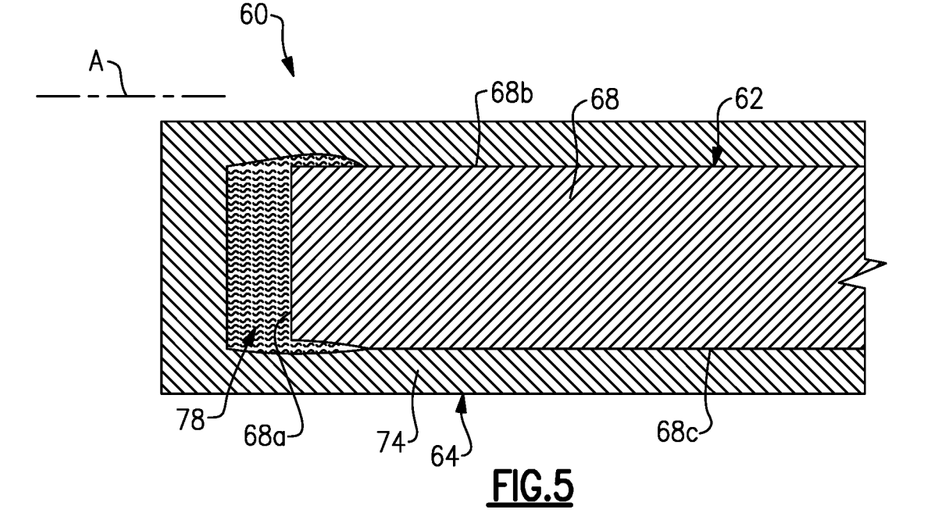
FIG. 5 illustrates a buffer layer that wraps around the edges of the axial face of the airfoil core.

In the illustrated example, the buffer layer 78 is located adjacent an axial face 68a of the root portion 68 of the airfoil core 62 in order to facilitate the absorbance of thermal growth in the axial direction. This is also shown in the isolated view of the airfoil core 62 in FIG. 4B, which excludes the ceramic matrix composite wrapping 64 in order to observe the buffer layer 78. The axial face 68a may be the forward or aft axial face of the airfoil core 62, or buffer layers 78 may be provided at both the forward and aft axial faces. In this example, the circumferential faces 68b/68c of the root portion 68 of the airfoil core 62 exclude the buffer layer 78. The buffer layer 78 is primarily or exclusively on the axial face 68a, however, as shown in FIG. 5 the buffer layer 78 may alternatively wrap around the localized edges of the axial face 68a, which may also experience thermal stress.

The axial thickness of the buffer layer 78, represented at 78a, is selected to be greater than the maximum thermal growth displacement between the root portions 68/74. For example, the thickness 78a of the buffer layer 78 is from 0.02 millimeters to 0.4 millimeters.

Figure 6:
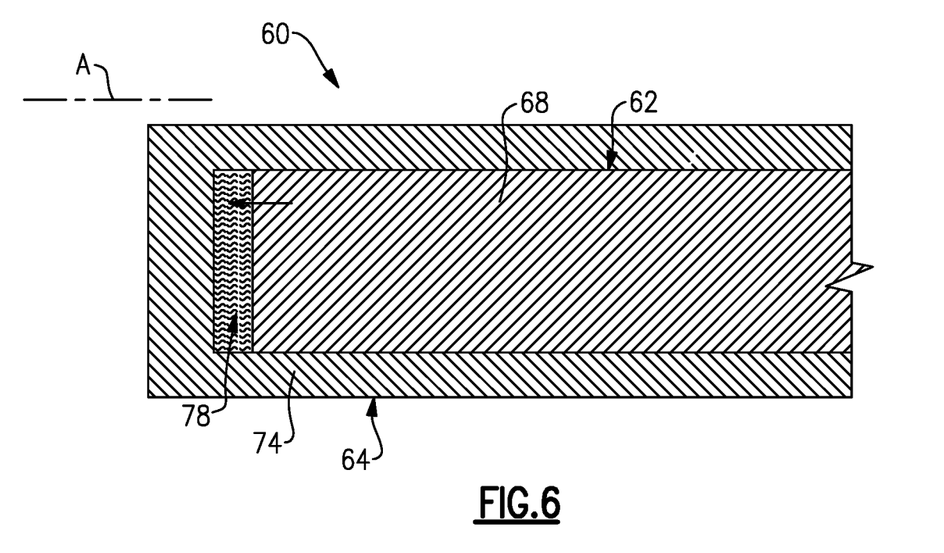
FIG. 6 illustrates the airfoil in an elevated thermal state in which there is relative displacement between the airfoil core and the platform.

FIG. 6 illustrates the same sectioned view as in FIG. 4 but under an elevated thermal state (temperature). For example, in the engine 20, the airfoil portion (66) temperature may be from approximately 600° C. to 1300° C., whereas the root portions 68a/68b/68c may be from approximately 300° C. to 700° C.

In the elevated thermal state there is a differential thermal expansion between the root portions 68/74 in the axial direction such that the buffer layer 78 is compressed between the root portions 68/74 and becomes reduced in volume. For instance, the buffer layer 78 may non-destructively compress or destructively compress (i.e., fracture). If the buffer layer 78 wraps around the localized edges of the axial face 68a (FIG. 5), the "arms" of the buffer layer 78 that wrap around may also be compressed. There may also be other forces on the airfoil 60, such as centrifugal forces from rotation.

Figure 7:
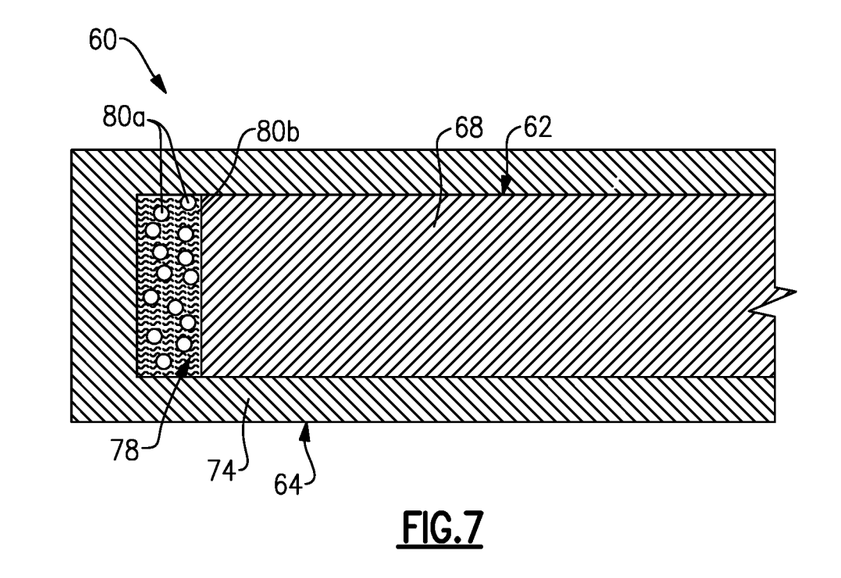
FIG. 7 illustrates an example of a buffer layer that includes hollow spheres.

The buffer layer 78 may be engineered in composition, structure, or both in order to provide a preset level of compressibility. For instance, as shown in the example in FIG. 7, the buffer layer 78 is a ceramic coating that includes hollow spheres 80a disposed in a matrix 80b. For example, the matrix 80b is alumina, silicon carbide, silicate, oxide, or combinations thereof and the spheres 80a are glass spheres. The spheres 80a are relatively weak and provide porosity in the coating to facilitate compressibility.

The ceramic matrix composite wrapping 64 may also facilitate reinforcement of the root portion 68 of the airfoil core 62. For example, the ceramic matrix composite wrapping 64 may serve to contain CMC plies in the root portion 68. Fibers in the CMC of the ceramic matrix composite wrapping 64 run in the hoop direction, providing high stiffness in tension and thus containing the root portion 68 to enhance interlaminar strength between CMC plies in the root portion 68.

Figure 8:
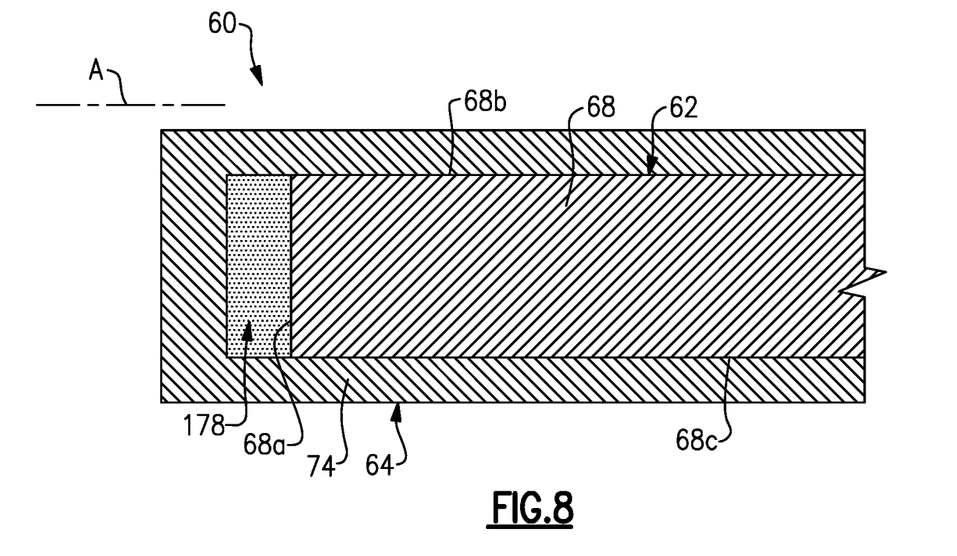
FIG. 8 illustrates another example airfoil that has a frangible layer.

FIG. 8 illustrates an example in which the airfoil 60 includes a frangible layer 178. In this disclosure, like reference numerals designate like elements where appropriate and reference numerals with the addition of one-hundred or multiples thereof designate modified elements that are understood to incorporate the same features and benefits of the corresponding elements. Here, the frangible layer 178 is similar to the buffer layer 78 but is designed to ensure fracture in compression under the elevated thermal state. As will be appreciated, since the frangible layer 178 is designed to fracture, the temperature at which the frangible layer 178 fractures corresponds to a typical use temperature of the airfoil 60, such as the temperature at cruise. In one example, the frangible layer 178 is a porous ceramic coating of alumina, silicon carbide, silicate, oxide, or combinations thereof that has a compressive strength that is below the stress produced from differences in thermal growth between the root portions 68/74. For example, the porosity, by volume percent, is from 50% to 90%. Thermal growth and stresses can be measured or estimated experimentally or by computer simulation for given materials and designs, and given this disclosure those skilled in the art will thus be readily able to identify useful frangible layers 178 and compressive strengths. Most typically, however, the compressive strength of the frangible layer 178 will be below 25 Mpa for relatively lower porosity compositions to less than 5 MPa for relatively highly porous frangible layers at a temperature of approximately 600° C.

Figure 9:
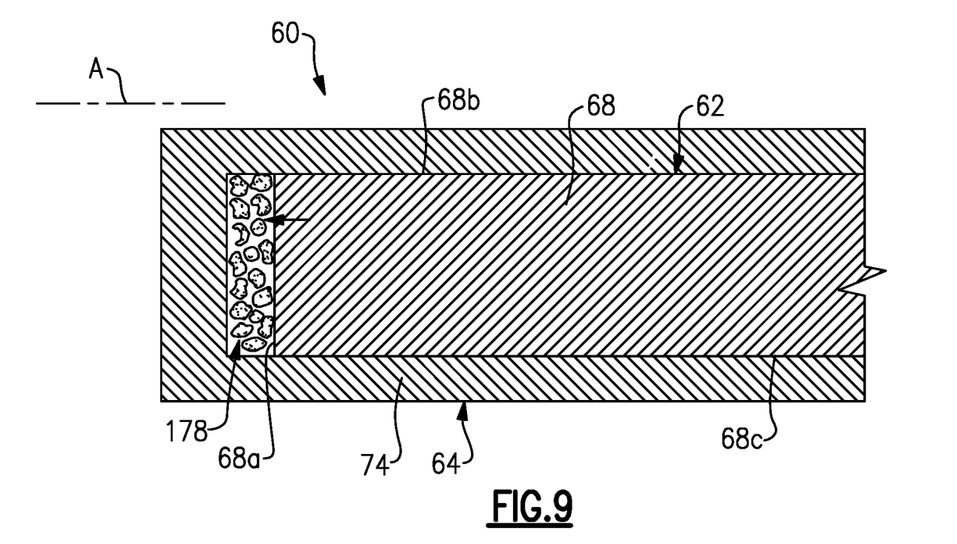
FIG. 9 illustrates the airfoil in an elevated thermal state in which there is relative displacement between the airfoil core and the platform.

FIG. 9 illustrates the same sectioned view as in FIG. 8 but under an elevated thermal state as described above. The frangible layer 178 is compressed between the root portions 68/74, reduces in volume, and fractures, i.e., is crushed, to absorb the relative thermal growth displacements between the root portions 68/74. Once initially crushed, the frangible layer 178 may or may not be crushed further upon additional thermal growth or cycles of expansion and contraction. The space that the frangible layer 178 occupies serves as an expansion gap after fracture to accommodate the relative thermal growth displacements between the root portions 68/74.

The buffer layer 78 or frangible layer 178 (collectively "layers 78/178") also serve to facilitate fabrication of the airfoil 60. For instance, during fabrication of the airfoil 60, the airfoil core 62 is fully or partially formed, and the ceramic matrix composite wrapping 64 is then formed around the root portion 68 of the airfoil core 62. But for the physical presence of the layer 78/178, there may be considerable difficulty in wrapping the ceramic matrix composite wrapping 64 to the required geometry and dimensions. For instance, if the region where the layer 78/178 resides were instead left void as a hollow expansion gap, there would be no structure on which to wrap the ceramic matrix composite wrapping 64 to ensure that the platform 64 is properly located. Rather, in the airfoil 60, the layers 78/178 also serve as a mandrel over which the ceramic matrix composite wrapping 64 is wrapped. The layers 78/178 support the ceramic matrix composite wrapping 64 and thus can ensure that the ceramic matrix composite wrapping 64 is properly located. Once the ceramic matrix composite wrapping 64 is wrapped and rigidized or consolidated via the matrix 76b, the ceramic matrix composite wrapping 64 is self-supporting. There is then no further need after fabrication of the ceramic matrix composite wrapping 64 for the layer 78/178 to support the ceramic matrix composite wrapping 64 and, therefore, even if the layer 78/178 fractures, the fracturing does not debit the performance of the airfoil 60.

In one further example fabrication, the airfoil core 62 is fully or substantially fully formed. For instance, the fiber structure 70c is provided, such as by a lay-up of plies that are formed into the desired geometry. The fiber structure 70c is then fully or partially densified with the matrix 70b. For instance, densification includes, but is not limited to, chemical vapor deposition of the matrix 70b. Subsequently, the layer 78/178 is arranged adjacent the axial face or faces 68a of the root portion 68 of the airfoil core 62. For instance, the layer 78/178 is deposited onto the axial face 68a by a process such as but not limited to plasma spraying. Once the layer 78/178 is fully formed, the fiber structure 76c of the ceramic matrix composite wrapping 64 is wrapped around the root portion 68 of the airfoil core 62 and the layer 78/178, such as by a lay-up of plies that are formed into the desired geometry. The fiber structure 76c is then densified with the matrix 76b, such as by chemical vapor deposition of the matrix 76b. If the fiber structure 70c of the airfoil core 62 was not fully densified, the fiber structure 70c may be further densified during densification of the fiber structure 76c. The layer 78/178 thus becomes trapped or sandwiched between the airfoil core 62 and the ceramic matrix composite wrapping 64.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
a ceramic matrix composite airfoil core defining an airfoil portion and a root portion;
a ceramic matrix composite wrapping around the root portion; and
a frangible layer between the root portion and the ceramic matrix composite wrapping, the frangible layer having a compressive strength that is below a stress produced from a difference in thermal growth between the root portion and the ceramic matrix composite wrapping with the root portion at 300° C. to 700° C. and the airfoil portion at 600° C. to 1300° C.

2. The airfoil as recited in claim 1, wherein the root portion has axial faces and circumferential faces, the frangible layer is on the axial faces.

3. The airfoil as recited in claim 2, wherein the frangible layer wraps around edges of the axial face onto localized portions of the circumferential faces, and a remainder of the circumferential faces exclude the frangible layer.

4. The airfoil as recited in claim 1, wherein the frangible layer has a thickness of 0.02 millimeters to 0.4 millimeters.

5. The airfoil as recited in claim 1, wherein the frangible layer is a ceramic coating and is selected from the group consisting of alumina, silicon carbide, and combinations thereof.

6. The airfoil as recited in claim 1, wherein the frangible layer includes hollow spheres disposed in a matrix.

7. The airfoil as recited in claim 6, wherein the matrix is selected from the group consisting of alumina, silicon carbide, and combinations thereof.

8. The airfoil as recited in claim 1, wherein the ceramic matrix composite wrapping defines a platform.

9. The airfoil as recited in claim 1, wherein the compressive strength is less than 25 MPa.

10. The airfoil as recited in claim 9, wherein the frangible layer has a porosity, by volume percent, of 50% to 90%.

11. The airfoil as recited in claim 10, wherein the frangible layer is selected from the group consisting of alumina, silicon carbide, silicon nitride, boron carbide, elemental silicon, and combination thereof.

12. The airfoil as recited in claim 11, wherein the compressive strength is less than 5 MPa.

13. An airfoil comprising:
a fiber-reinforced composite airfoil core defining an airfoil portion and a root portion, the root portion defining axial faces and circumferential faces, and the fiber-reinforced composite airfoil core being subject to core thermal growth;
fiber-reinforced composite wrapping around the root portion, the fiber-reinforced composite wrapping being subject to wrapping thermal growth; and
a buffer layer on the axial faces between the root portion and the fiber-reinforced composite wrapping, the buffer layer wrapping around edges of the axial faces onto localized portions of the circumferential faces, and a remainder of the circumferential faces excluding the buffer layer, the buffer layer absorbing a mismatch between the core thermal growth and the platform thermal growth.

14. The airfoil as recited in claim 13, wherein the buffer layer is a coating.

15. The airfoil as recited in claim 14, wherein the coating is selected from the group consisting of alumina, silicon carbide, and combinations thereof.

16. The airfoil as recited in claim 13, wherein the buffer layer includes hollow spheres disposed in a matrix.

17. The airfoil as recited in claim 16, wherein the matrix is selected from the group consisting of alumina, silicon carbide, and combinations thereof.

18. The airfoil as recited in claim 13, wherein the buffer layer has a compressive strength of less than 25 MPa and a porosity, by volume percent, of 50% to 90%.

19. A gas turbine engine comprising:
a compressor section;
a combustor in fluid communication with the compressor section; and
a turbine section in fluid communication with the combustor,
the turbine section having an airfoil that includes
a ceramic matrix composite airfoil core defining an airfoil portion and a root portion,
the root portion defining axial faces and circumferential faces,
a ceramic matrix composite wrapping around the root portion, and
a buffer layer on the axial faces between the root portion and the ceramic matrix composite wrapping.

20. An airfoil comprising:
a ceramic matrix composite airfoil core defining an airfoil portion and a root portion, the root portion defining axial faces;
a ceramic matrix composite wrapping around the root portion; and
a frangible layer between the ceramic matrix composite wrapping and at least the axial faces of the root portion, the frangible layer crushing into fractured pieces under compressive stress due to differential thermal expansion between the ceramic matrix composite wrapping and the root portion and thereby providing an expansion gap for differential thermal growth displacement between the ceramic matrix composite wrapping and the root portion.

21. The airfoil as recited in claim 20, wherein the frangible layer has a thickness of 0.02 millimeters to 0.4 millimeters.

22. The airfoil as recited in claim 21, wherein the frangible layer has a porosity, by volume percent, of 50% to 90%.

* * * * *